US012770445B2

(12) United States Patent
Fitzgibbon

(10) Patent No.: US 12,770,445 B2
(45) Date of Patent: Oct. 20, 2026

(54) ACCESS CONTROL APPARATUS

(71) Applicant: THE CHAMBERLAIN GROUP LLC, Oak Brook, IL (US)

(72) Inventor: James J. Fitzgibbon, Batavia, IL (US)

(73) Assignee: THE CHAMBERLAIN GROUP, LLC, Oak Brook, IL (US)

( * ) Notice: Subject to any disclaimer, the term of this patent is extended or adjusted under 35 U.S.C. 154(b) by 302 days.

(21) Appl. No.: 18/738,652

(22) Filed: Jun. 10, 2024

(65) Prior Publication Data

US 2024/0420526 A1 Dec. 19, 2024

Related U.S. Application Data

(60) Provisional application No. 63/521,211, filed on Jun. 15, 2023.

(51) Int. Cl.
*G07C 9/00* (2020.01)
*H01Q 1/52* (2006.01)

(52) U.S. Cl.
CPC ........... *G07C 9/00182* (2013.01); *H01Q 1/52* (2013.01); *G07C 2209/63* (2013.01)

(58) Field of Classification Search
CPC ........... G07C 9/00182; G07C 2209/63; G07C 9/00309
See application file for complete search history.

(56) References Cited

U.S. PATENT DOCUMENTS

| | | | | |
|---|---|---|---|---|
| 10,769,872 B2 * | 9/2020 | Zhong | G07C 9/00309 |
| 11,302,132 B1 * | 4/2022 | Grohman | H04W 12/0431 |
| 2003/0038732 A1 * | 2/2003 | Watarai | G07C 9/00309 340/13.24 |
| 2006/0186993 A1 * | 8/2006 | Inoue | H04K 3/92 340/5.72 |
| 2019/0012859 A1 * | 1/2019 | Leonhardt | G07C 9/00309 |

* cited by examiner

*Primary Examiner* — Nabil H Syed
(74) *Attorney, Agent, or Firm* — Dority & Manning, P.A.

(57) ABSTRACT

A lockset including a housing configured to be mounted at a secured entrance; a radio module supported by the housing, the radio module generating: an antenna pattern for communicating with a user device; and a squelch signal that prevents the radio module from receiving a credential signal from the user device when the user device is at one or more locations within the antenna pattern; and a processor in communication with the radio module, wherein the processor unlocks a deadbolt to permit entry into a secured area delimited by the secured entrance in response to the radio module receiving the credential signal from the user device.

18 Claims, 13 Drawing Sheets

ACCESS CONTROL APPARATUS

CROSS-REFERENCE TO RELATED APPLICATIONS

The present application claims priority to U.S. Provisional Application Ser. No. 63/521,211 filed on Jun. 15, 2023, the disclosure of which is incorporated by reference herein in its entirety.

TECHNICAL FIELD

This disclosure relates to access control apparatuses and, more specifically, to access control apparatuses that are operable by a user device.

BACKGROUND

Access control apparatuses are known, including smart locksets, to control access to a secured area such as a residence. Some smart locksets are configured with an automated unlock feature to automatically unlock the smart lockset when an authorized user device arrives at an exterior of the residence. The authorized user device communicates with the smart lockset, such as using a local Wi-Fi network or Bluetooth® signals, to unlock the smart lockset.

Some smart locksets are further configured to prevent unlocking of the smart lockset from occurring unintentionally as a result of the authorized user device being mistakenly identified as external to the residence while instead being located inside the residence. In particular, these smart locksets can be configured to utilize location verification techniques (e.g., received signal strength indicators, GPS coordinates, etc.), intention indicators (e.g. requiring a user to touch the handle or doorknob), or similar, to limit such unintended unlock events.

BRIEF DESCRIPTION

Aspects and advantages of the invention in accordance with the present disclosure will be set forth in part in the following description, or may be obvious from the description, or may be learned through practice of the technology.

In accordance with one embodiment, a lockset is provided. The lockset includes a housing configured to be mounted at a secured entrance; a radio module supported by the housing, the radio module generating: an antenna pattern for communicating with a user device; and a squelch signal that prevents the radio module from receiving a credential signal from the user device when the user device is at one or more locations within the antenna pattern; and a processor in communication with the radio module, wherein the processor unlocks a deadbolt to permit entry into a secured area delimited by the secured entrance in response to the radio module receiving the credential signal from the user device.

In accordance with another embodiment, a radio module for a lockset is provided. The radio module includes a primary antenna that generates an antenna pattern including a primary lobe and one or more ancillary lobes, wherein the primary lobe projects in a directional manner, wherein the one or more ancillary lobes project in a generally uniform manner, and wherein the primary antenna is configured to receive a credential signal from a user device; and a secondary antenna that generates a squelch signal that interferes with the one or more ancillary lobes to prevent the primary antenna from receiving the credential signal through the one or more ancillary lobes.

In accordance with another embodiment, a method of operating a lockset is provided. The method includes generating, by a radio module of the lockset, an antenna pattern for communicating with a user device; determining, by a processor of the lockset, whether a squelch signal trigger event occurred; broadcasting, by the radio module, a squelch signal in response to the processor determining the squelch signal trigger event occurred, the squelch signal preventing the radio module from receiving a credential signal from the user device when the user device is at one or more locations within the antenna pattern; and stopping broadcast of the squelch signal upon expiration of a squelch signal broadcast timer, the squelch signal broadcast timer initiated by broadcast of the squelch signal.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

Figure 1:
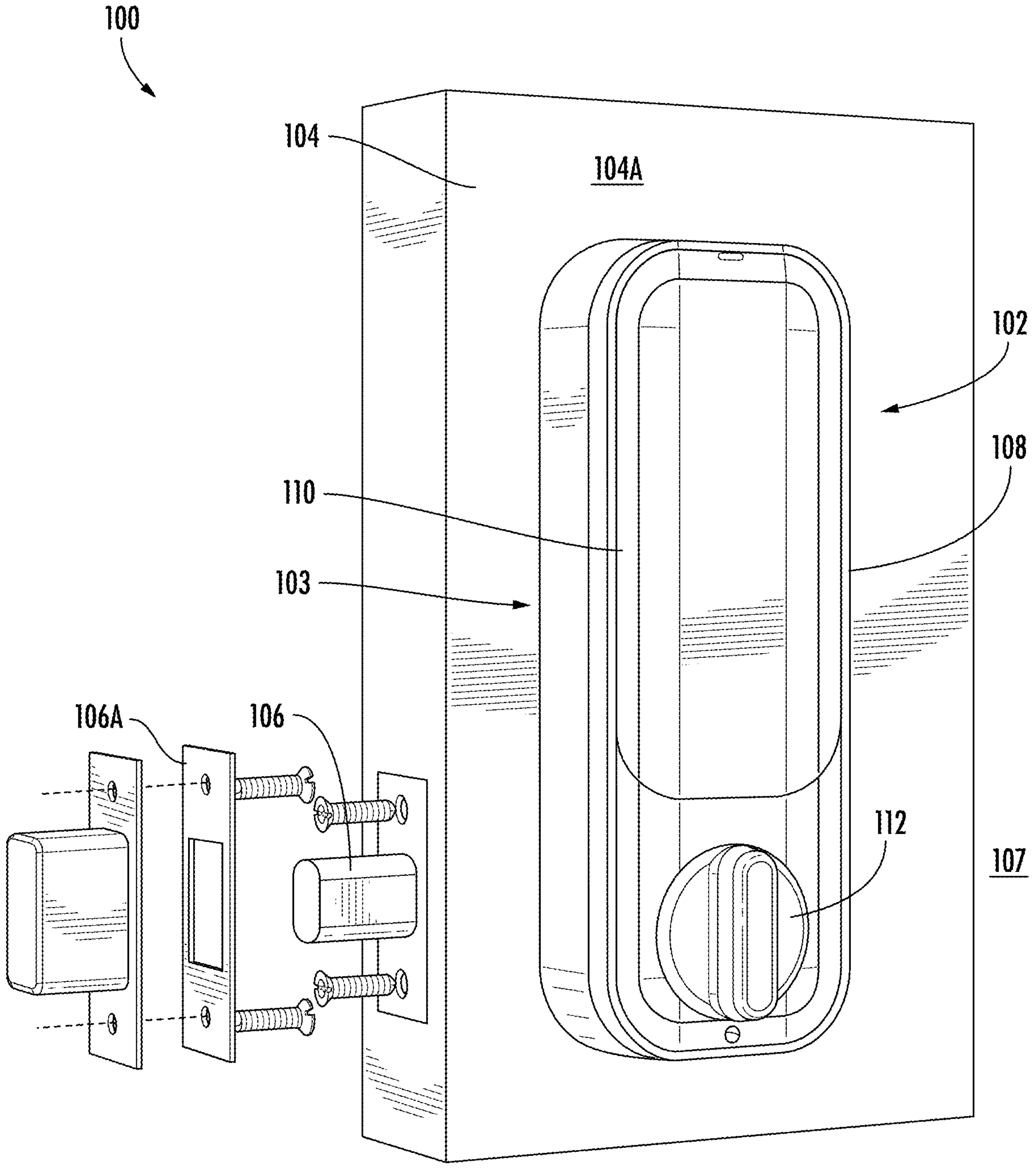
FIG. 1 is a front perspective view of a smart lockset from inside a residence.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions, operations and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

In one aspect of the present disclosure, an access control apparatus for a secured area is provided. The access control apparatus includes a directional antenna and a squelch signal transmitter that cooperate to facilitate: automated unlocking of the access control apparatus when an authorized user device approaches the access control device from outside of the secured area; and inhibiting automated unlocking of the access control apparatus when the authorized user device approaches the access control device from inside of the secured area.

The directional antenna is configured to receive and/or transmit radio frequency signals in a signal communication area to detect an authorized user device approaching the access control apparatus from outside of the secured area. An authorized user device carried by the user in the signal communication area of the directional antenna may thereby transmit a credential to the access control device that is received by the directional antenna and effects automatic unlocking of the access control device.

To inhibit unintended unlocking of the access control apparatus, the squelch signal transmitter is configured to transmit a squelch signal to provide a signal blocking area for the directional antenna in a portion of the signal communication area located adjacent the access control device and inside the secured area. For example, the squelch signal transmitter may include an omnidirectional antenna that transmits a squelch signal inside of the secured area and outside of the secured area to disable or impede the directional antenna from receiving signals that originate from inside of the secured area. Thus, an authorized user device that transmits a signal with a credential from within the signal blocking area inside the secured area will have the signal interfered with, scrambled, or interrupted by the squelch signal. To effect automatic operation of the access control device, the authorized user device should transmit the credential in the portion of the signal communication area of the directional antenna that is outside of the signal blocking area of the squelch signal transmitter.

As another example, the squelch signal transmitter may include a directional antenna that transmits a squelch signal in the interior of the secured area. The signal blocking area is thereby in the interior of the secured area, such that an authorized user device may effect automatic unlocking of the access control device by approaching the access control device from the exterior of the secured area and being within the signal communication area of the directional antenna.

Figure 2:
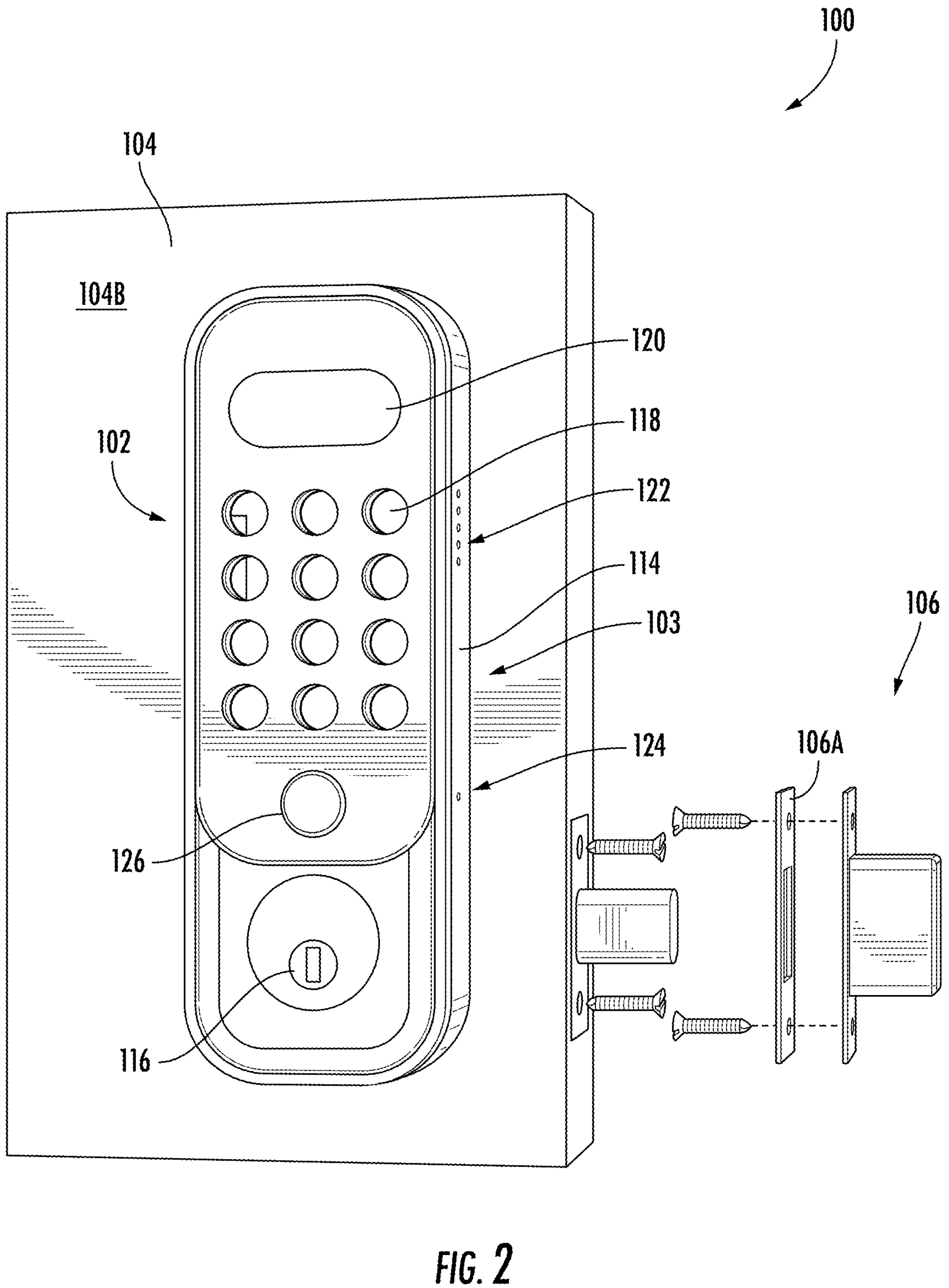
FIG. 2 is a rear perspective view of the smart lockset of FIG. 1 from outside the residence.

Referring now to FIGS. 1 and 2, a door lock system 100 is shown. The door lock system 100 includes an access control apparatus such as a smart lockset 102. The smart lockset 102 has a housing 103 for being mounted at a secured entrance (e.g., to a door 104 to a secured area 107) and a deadbolt 106 configured to shift between extended and retracted positions to unlock and lock the door 104. In the extended state, the deadbolt 106 extends into a strike plate 106A mounted to a door jamb.

An interior portion 108 of the smart lockset 102 is located on an interior side 104A of the door 104 as shown in FIG. 1. The interior portion 108 includes an interior display 110 (which may be optional in some embodiments) and a manual actuator 112 (e.g., a thumb turn) configured to manual actuate the lockset 106 between a locked and unlocked position in response to a user turning the manual actuator 112. An exterior portion 114 of the smart lockset 102 located on an exterior side 104B of the door 104 is shown in FIG. 2. The exterior portion 114 includes a key cylinder 116 configured to manually actuate the lockset 106 between the locked and unlocked position in response to a key 427 (see FIG. 6) being inserted and turned in the key cylinder 116. As shown in FIG. 2, the exterior portion 114 also includes a keypad 118, an exterior display 120, a speaker 122, a microphone 124, and a fingerprint sensor 126. The exterior portion 114 may include a camera or imaging module to facilitate other biometric access techniques such as iris scanning, facial recognition, person recognition, etc. which may be employed in addition to or as an alternative to the fingerprint sensor 126.

Figure 3:
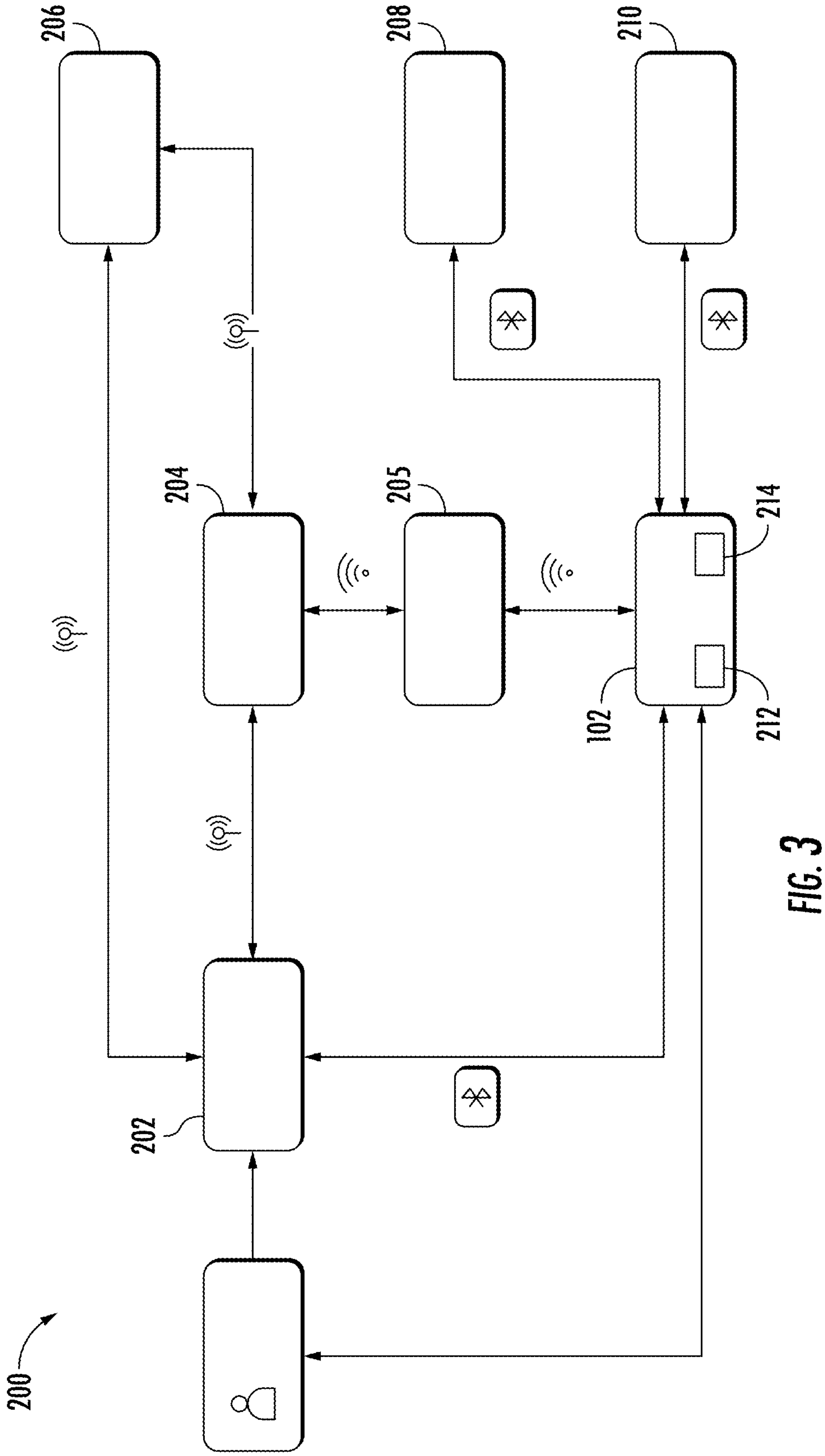
FIG. 3 is a block diagram of a system including the smart lockset of FIG. 1.

Referring now to FIG. 3, an access control system 200 is provided that includes the smart lockset 102. The access control system 200 includes a user device 202 such as a mobile phone, smartwatch, smart wearable, tablet computer, laptop computer, or the like configured to wirelessly connect to the smart lockset 102 via Bluetooth® or another wireless communication protocol. The access control system 200 also includes a server computer 204 connected to the user device 202 and the smart lockset 102 via a local or wide area network such as the internet. In some embodiments, a router 205 or access point is used to connect the smart lockset 102 and/or the user device 202 to the server computer 204. Additionally or alternatively, the smart lockset 102 may communicate wirelessly with a local gateway 210 that, in turn, communicates with the server computer 204. For example, the smart lockset 102 may communicate with the local gateway 210 via Bluetooth® and the local gateway 210 communicates with the server computer 204 via the router 205 or a wide-area network such as the internet, a cellular data network, or similar.

The access control system 200 includes an interface (e.g. an application programming interface "API") to integrate with one or more external partner services 206 accessible through the user device 202 and the smart lockset 102 either directly or via the server computer 204. The external partner services 206 may include, for example, various third-party services that rely on accessing a home or other secured area for unattended in-home package/parcel delivery, home rental (e.g., Airbnb or VRBO), pet-sitting, dog-walking, home healthcare, home cleaning/maintenance/repair, and others. Additionally, the smart lockset 102 can be configured to communicate with a garage door opener (GDO) 208 via Bluetooth or another wireless communication protocol including via a local or wider area network via Wi-Fi and the router 205.

As shown in FIG. 3, the smart lockset 102 includes a processor 212 and a memory 214. The processor 212 is configured to execute computer-readable instructions stored on the memory 214 to perform any of the various methods described herein. The processor 212 may include, for example, a microprocessor, a system-on-a-chip, an application specific integrated circuit (ASIC), a field programmable gate array (FPGA), or other device configurable to execute the instruction stored in the memory 214. The memory 214 may include, for example, an electrical charge-based storage media such as EEPROM or RAM, or another non-transitory computer readable medium.

Figure 4:
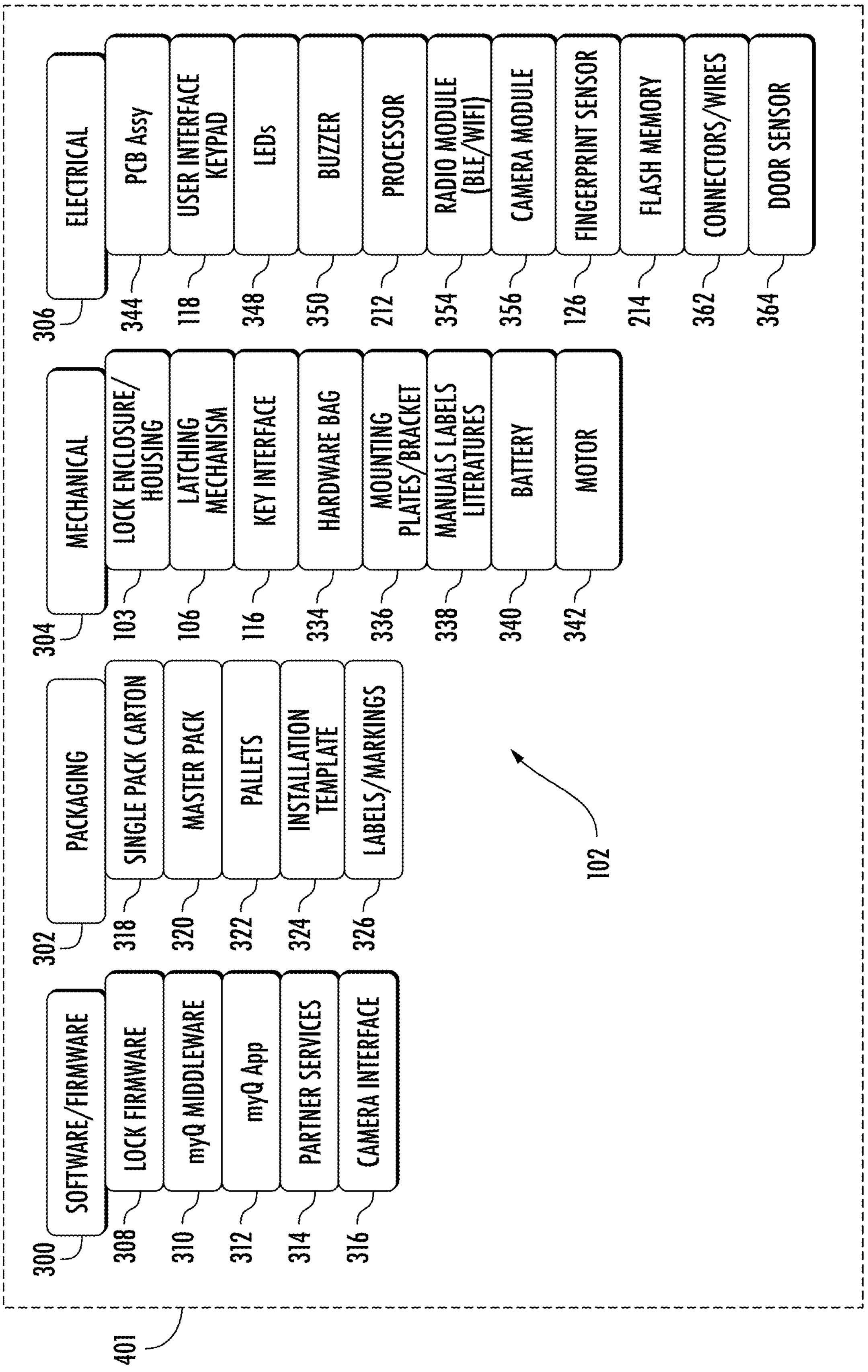
FIG. 4 is a block diagram of a subsystem of the smart lockset of FIG. 1.

Referring now to FIG. 4, a schematic diagram is provided of a smart lockset kit 401. The smart lockset kit 401 includes the smart lockset 102 in packaging 302, such as a box. The smart lockset 102 includes a software/firmware system 300, mechanical components 304, and electrical components 306.

The software/firmware system 300 includes lock firmware 308 for operating some or all of the mechanical components 304 and/or the electrical components 306, a middleware interface 310 for communicating with the server computer 204 (FIG. 3), an application interface 312 for connecting to and communicating with a client application operating on the user device 202 (FIG. 3) or a similar device, a partner services interface 314 for communicating with the various external partner services 206 (FIG. 3), and a camera interface 316 for communicating images, e.g. video and/or still images, captured by the smart lockset 102 to other devices such as the user device 202.

The packaging 302 may include a single pack carton 318, a master pack carton 320, pallet(s) 322, an installation template 324, and labels and markings 326. Furthermore, the mechanical components 304 include the housing 103, the latching mechanism such as deadbolt 106, the key interface such as key cylinder 116, installation hardware 334, a mount 336 such as a bracket, an installation manual 338, a battery power source 340 for powering the smart lockset 102, and a motor 342 for operating the deadbolt 106 at the direction of the processor 212. The electrical components 306 include a printed circuit board assembly 344 which includes at least some of the electrical components 306, such as the processor 212 and the memory 214. The electrical components 306 also include the keypad 118, light emitting diodes 348, a buzzer 350, communication circuitry such as a radio module 354, a camera 356, the fingerprint sensor 126, wire or other electrical connectors 362, and a door sensor 364 for detecting when the door 104 (FIG. 1) is open or closed.

Figure 5:
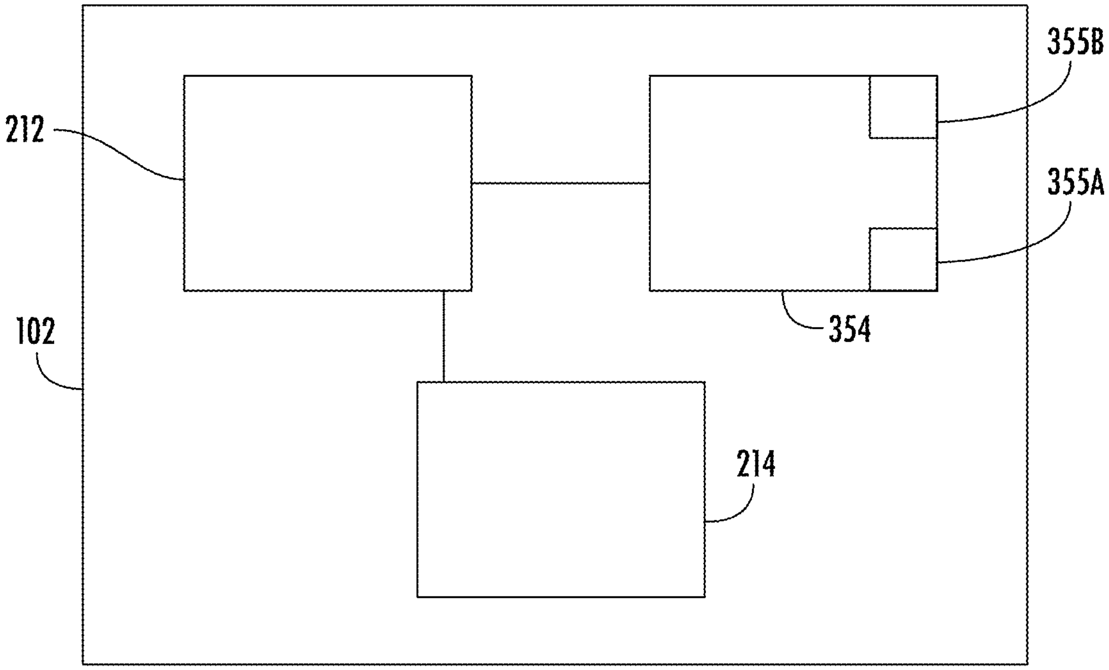
FIG. 5 is a block diagram of the smart lockset of FIG. 1.

Referring now to FIG. 5, a block diagram of the smart lockset 102 is shown. The smart lockset 102 includes the processor 212 electrically coupled to the memory 214 and the radio module 354. Furthermore, the radio module 354 can include one or more radio frequency antennas such as a primary directional antenna 355A and a secondary antenna 355B. In some embodiments, the directional antenna 355A can be utilized for communicating with the user device 202 (FIG. 2) using Bluetooth® or another radio frequency communication protocol. The secondary antenna 355B can include an omni-directional or directional antenna configured to broadcast a squelch signal 600 (see FIG. 8) in the direction of the processor 212. In some embodiments, the directional antenna 355A can be utilized to simultaneously broadcast the squelch signal 600 either in addition to, or instead of, the secondary antenna 355B.

Figure 6:
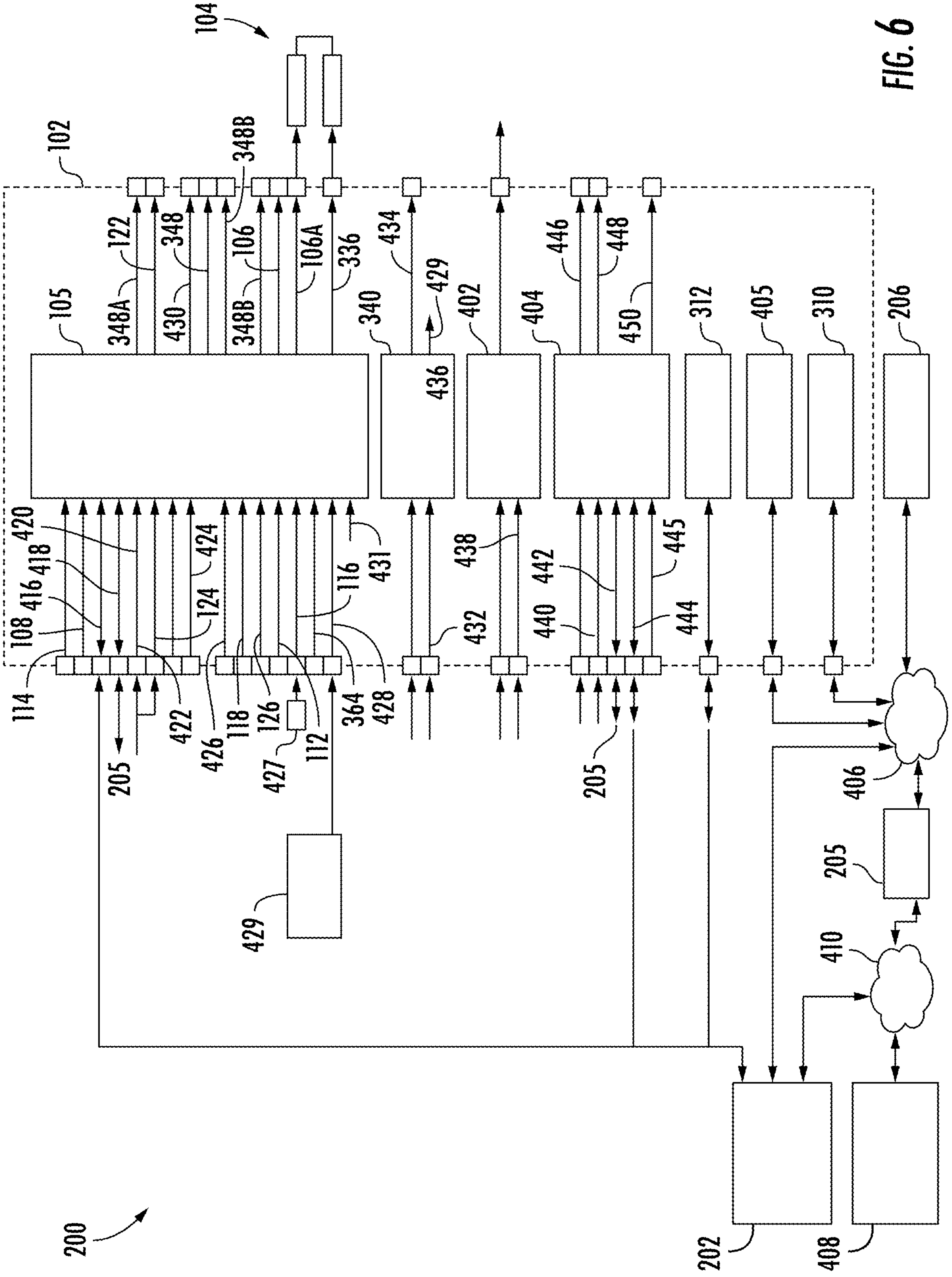
FIG. 6 is a block diagram of a system including the smart lockset of FIG. 1.

Referring now to FIG. 6, a schematic diagram of the access control system 200 is shown. The smart lockset 102 further includes an alternating current (AC) power supply 402, a remote speaker such as a door chime 404, and a video server interface 405. The video server interface 405 and the middleware interface 310 can communicate with the user device 202 and the various external partner services 206 over a wide area network 406 such as the internet. Furthermore, a smart home assistant device 408 can be configured to communicate with the video server interface 405, the middleware interface 310, and other portions of the smart lockset 102 via a network via an access point such as a local area home network 410 managed by the router 205. As shown in FIG. 6, the user device 202 can also connect to the home network 410 to communicate with the smart lockset 102 and/or other systems and devices using the wide area network 406.

As shown in FIGS. 1 and 2, the housing 103 can include the exterior portion 114 and the interior portion 108 to act as exterior and interior interfaces for the smart lockset 102 respectively. Furthermore, the smart lockset 102 includes a Bluetooth® interface 416 (FIG. 6) for communicating with the user device 202 and a Wi-Fi interface 418 for wirelessly communicating with the router 205 and any devices connected thereto. In some embodiments, the Bluetooth® interface 416 and the Wi-Fi interface 418 can be part of the radio module 354 (FIG. 5) and can utilize either of the antennas 355A or 355B for communicating. For example, the Bluetooth® interface 416 can utilize the directional antenna 355A as described in more detail herein. The smart lockset 102 can also include a wired connection to the router 205 or other portions of the access control system 200.

As shown in FIG. 6, the smart lockset 102 includes a body 105 for mounting to a door, the body 105 including the housing 103 and the mount 336. The body 105 includes a lens 420 of the camera 356 (FIG. 4), an ambient light sensor 422, a reset button 424, a call button 426, the keypad 118, the fingerprint sensor 126, the manual actuator 112, the key cylinder 116, and the door sensor 364. The body 105 also includes an emergency power interface 428 for coupling to an emergency direct current (DC) power source 429 such as an external power bank battery or the like and a standard power input 431 for receiving power from the battery power source 340. The body 105 also includes an infrared LED 348A, the speaker 122, a buzzer 430, a first LED ring 348B, a second LED light ring 348C, and the dead bolt 106. The infrared LED 348A, the first LED ring 348B, and the second LED light ring 348C are formed by the light emitting diodes 348 (FIG. 4).

The battery power source 340 includes a charge port 432 for receiving a DC power input from the power supply 402 used to recharge the battery power source 340, a status LED 434 and contact terminals 436 that interface with the standard power input 431. The power supply 402 includes an AC power input 438 that receives AC power that is converted by the power supply 402 into the DC power that is then supplied to recharge the battery power source 340.

The door chime 404 may be mounted to a surface in the interior of the secured area, such as on a wall near the door 104, to alert an individual inside the secured area of the presence of someone at the exterior of the door 104. The door chime 404 includes an AC power input 440, a Wi-Fi interface 442 for communicating with the router 205 and any device connected to the local area home network 410, a Bluetooth interface 444 for communicating directly and wirelessly with the user device 202, a reset button 445, a speaker 446, and a mount 450 for securing the door chime 404 at a suitable location. The door chime 404 provides an audio notification upon the Wi-Fi interface 442 receiving a corresponding signal from the Wi-Fi interface 418 indicating a user input at the smart lockset 102. For example, the user input may include a user input to the fingerprint sensor 126, the keypad 118, or the presence of an individual in proximity to exterior of the door 104.

Figure 7:
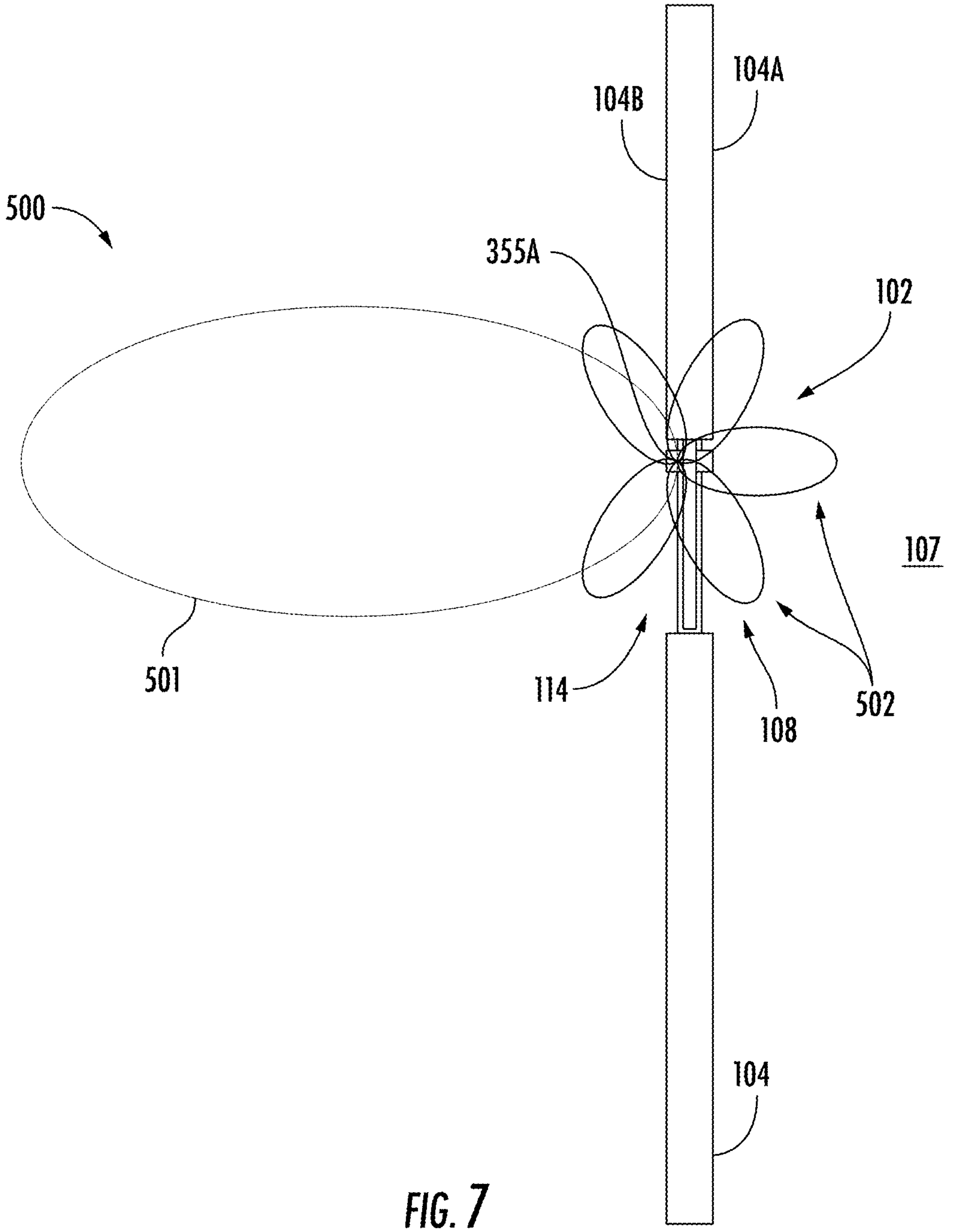
FIGS. 7 and 8 are diagrams of antenna patterns for the smart lockset of FIG. 1.

FIG. 7 illustrates a schematic diagram of an antenna pattern 500 for the directional antenna 355A (FIG. 5) of the smart lockset 102 in accordance with an embodiment. As shown in FIG. 7, the antenna pattern 500 produced by the directional antenna 355A is made up of a primary lobe 501 and ancillary lobe(s) 502 that correspond to locations proximate to the door 104 from which the directional antenna 355A is configured to receive wireless signals from the user device 202 (FIG. 3) or other similar devices. The primary lobe 501 projects predominantly away from the exterior side 104B of the door 104 and the ancillary lobes 502 project away from the door 104 in a generally uniform manner outward from the directional antenna 355A from both the interior side 104A and the exterior side 104B as shown in FIG. 7. Because at least some of the ancillary lobes 502 project away from the interior side 104A of the door 104 (i.e., into a secured area 107), the directional antenna 355A is capable of receiving radio frequency signals broadcast by the user device 202 from locations inside the secured area 107 employing the smart lockset 102. To configure the smart lockset 102 to refrain from triggering an automated unlocking of the lockset 106 (FIG. 1) as a result of detecting the user device 202 inside of the secured area 107, the smart lockset 102 is configured to output the squelch signal 600 as shown in FIG. 8.

The squelch signal 600 is output when the directional antenna 355A is operable to receive a radio frequency communication from the user device 202. The squelch signal 600 may be output and the directional antenna 355A operated continuously or in response to a triggering event detected by the processor 212. For example, the smart lockset 102 can operate the directional antenna 355A continuously or intermittently according to a schedule, whereas the smart lockset 102 transmits the squelch signal 600 when the camera 356 (FIG. 4) or some other component (e.g. a passive infrared 'PIR' sensor) of the smart lockset 102 detects a presence of a person on the exterior side 104B of the door 104 and/or the smart lockset 102 is not in a low power mode. In particular, refraining from transmitting the squelch signal 600 while in the low power mode can reduce power use by the smart lockset 102 to thereby extend a battery life of the smart lockset 102. Additionally or alternatively, the smart lockset 102 can output the squelch signal 600 in response to an initial reception or detection of a signal by the radio module 354. The signal received by the radio module 354 may be, for example, an initial Bluetooth® communication from a user device 202 outside of the secured area. The initially detected signal can be disregarded by the processor 212 when determining whether an authorized device such as the user device 202 (FIG. 3) is present on the exterior side 104B of the door 104. In some embodiments, the smart lockset 102 can output or transmit a beacon or advertising signal to trigger a nearby user device to respond by broadcasting a credential signal. During output of the beacon signal, the squelch signal may not be transmitted so as to increase the coverage area of the beaconing/advertising. After the beacon broadcast, the squelch signal may be output based on a specified/predetermined beacon response timing (e.g. when a transceiver of the smart lockset 102 starts listening for the response broadcast from the user device).

Figure 8:
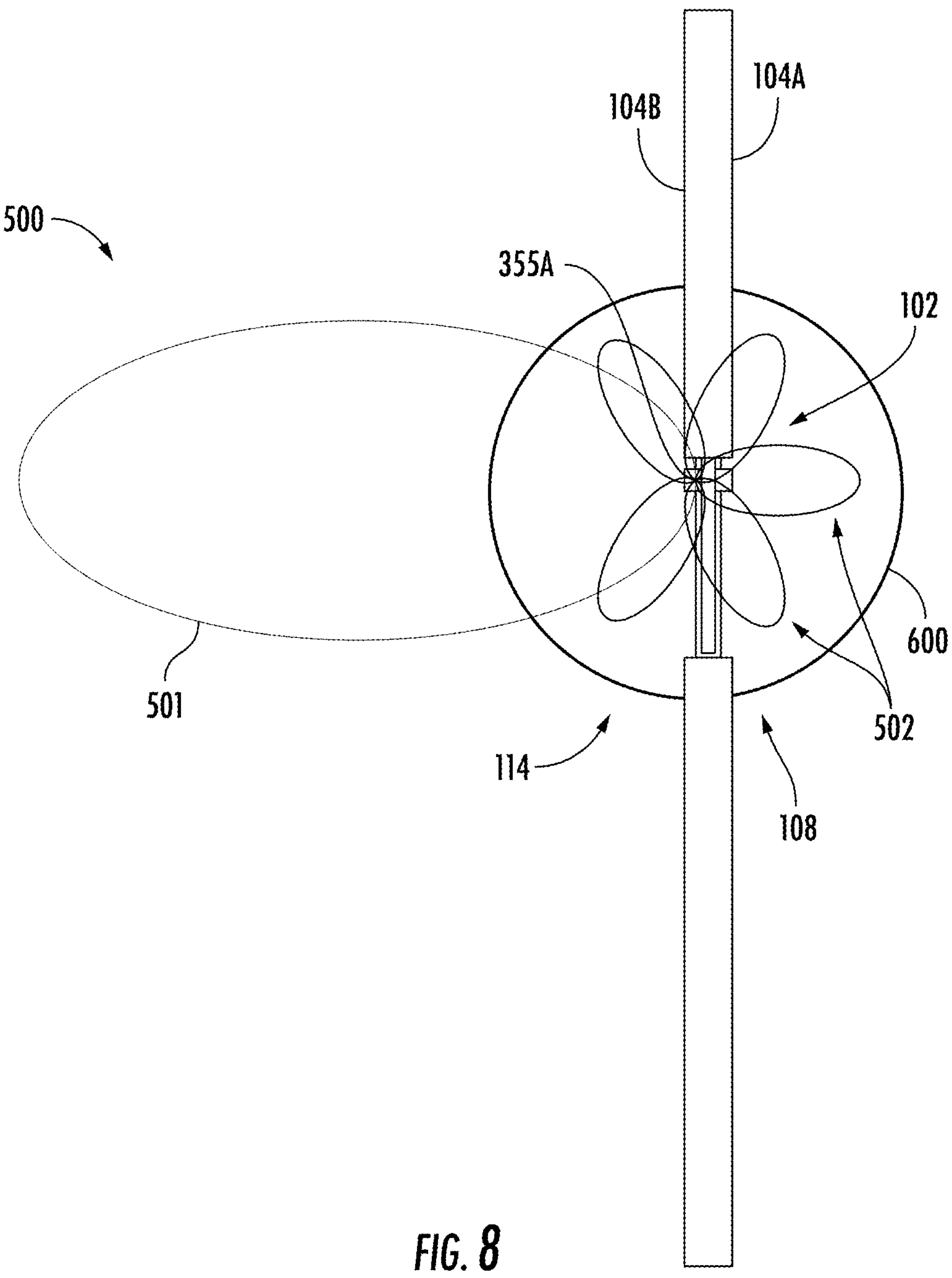

As shown in FIG. 8, the squelch signal 600 is broadcast out from the smart lockset 102 in a pattern that encompasses the ancillary lobe(s) 502. As used herein, the term "encompassing" refers to complete, or nearly complete, spatial overlap such that the encompassed element is surrounded entirely, or nearly entirely, by the encompassing element. In some embodiments, the squelch signal 600 can include random noise or other interference signals broadcast at specific level (e.g. a specific power level in dB, watts, or effective radiated power, amplitude, and/or frequency) sufficient to create an interference area that encompasses and/or extends beyond the ancillary lobe(s) 502 or a subset of the ancillary lobe(s) 502. The squelch signal 600 is configured to interfere with the directional antenna 355A receiving, via the ancillary lobe(s) 502, a credential signal from the user device 202.

The processor 212 (FIG. 3) may compare a signal strength of any received signals to the specific level of the squelch signal 600 and only act on or accept as valid received signals that have a signal strength that is greater than the specific level of the squelch signal 600. The specific level of the squelch signal 600 can be set to account for undesirable reception capabilities from inside a residence. In particular, the level of the squelch signal 600 can be adjusted at a factory during manufacture or at the secured area 107 during installation. The adjustment of the specific level of the squelch signal 600 can be performed by a client application requesting or prompting an installer to position a user device like the user device 202 proximate the interior side 104A and then determining an adjustment amount for the specific level of the squelch signal 600 to interfere with or otherwise block reception via the ancillary lobes 502. Manual adjustment of the specific level of the squelch signal 600 can also occur after installation.

The squelch signal 600 can be transmitted with certain parameters or attributes such as frequency, amplitude, periodicity, power level, etc. such that output of the squelch signal cancels out, garbles, or otherwise interferes with other signals that may have been received by the ancillary lobes 502 within the broadcast area of the squelch signal 600. In this manner, the processor 212 will be focused on responding to signals received via the primary lobe 501 on the exterior side 104B of the door 104 since signals received via the ancillary lobe(s) 502 will be undecipherable or otherwise inhibited. The squelch signal 600 can be broadcast on the directional antenna 355A or the secondary antenna 355B (see FIG. 5).

Figure 10:
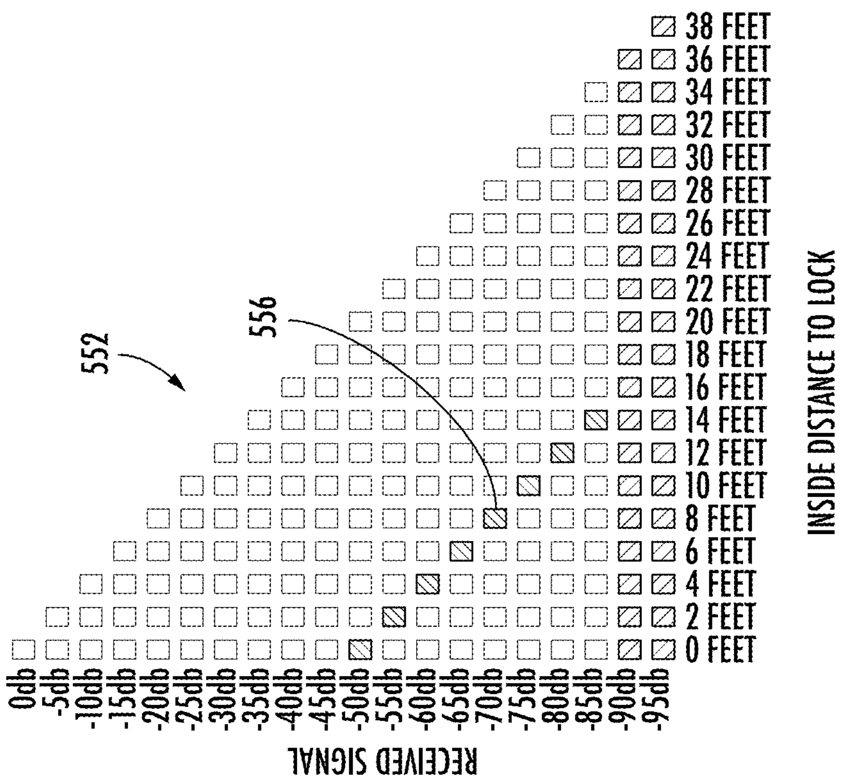
FIGS. 9-14 are views of graphs showing received signal strength as a function of distance from an interior side and an exterior side of a door in which the smart lockset of FIG. 1 is mounted.
Figure 9:
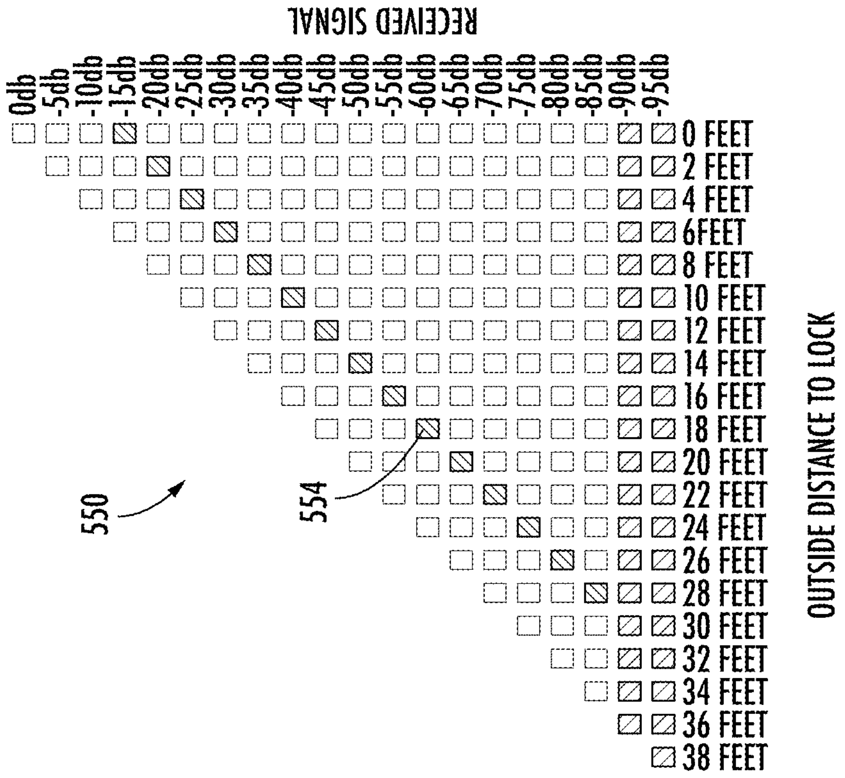

Referring now to FIGS. 9 and 10, graphs 550, 552 show received signal strength 554, 556 or power at the directional antenna 355A for a credential signal broadcast from a user device such as user device 202 (see FIG. 3) when the squelch signal 600 is not active and as a function of a distance from the interior side 104A and the exterior side 104B in accordance with an example embodiment. While scale is shown by way of the axis, it should be understood that the units and/or scale depicted in FIGS. 9 and 10 is for illustration only and may vary based on the sensitivity, settings, and/or configuration of the smart lockset 102, the user device 202, or the like. Where the user device 202 (see FIG. 3) is configured to broadcast the credential signal at a constant output power, the received signal strength 554, 556 of that signal at the directional antenna 355A is weaker the farther the user device 202 is away from the smart lockset 102. In particular, as shown in FIGS. 9 and 10 the received signal strength 554, 556 is greatest when the user device 202 is located approximately 0 feet from the smart lockset 102 on either the interior side 104A or the exterior side 104B. The received signal strength 554, 556 attenuates (drops) by approximately 5 dB for every 2 feet the user device 202 moves away from the interior side 104A or the exterior side 104B.

Figure 12:
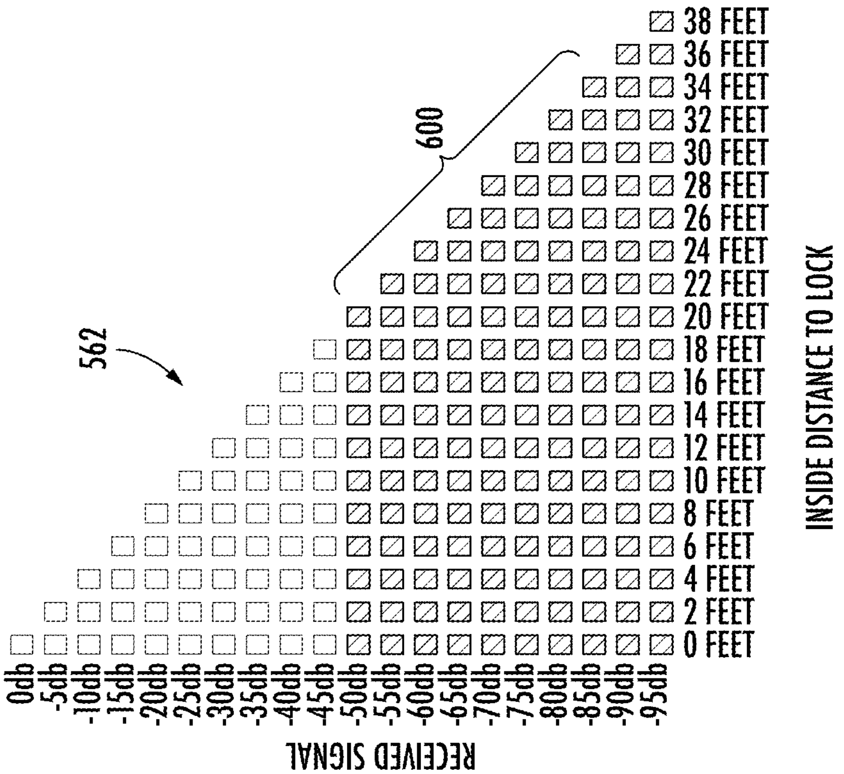
Figure 11:
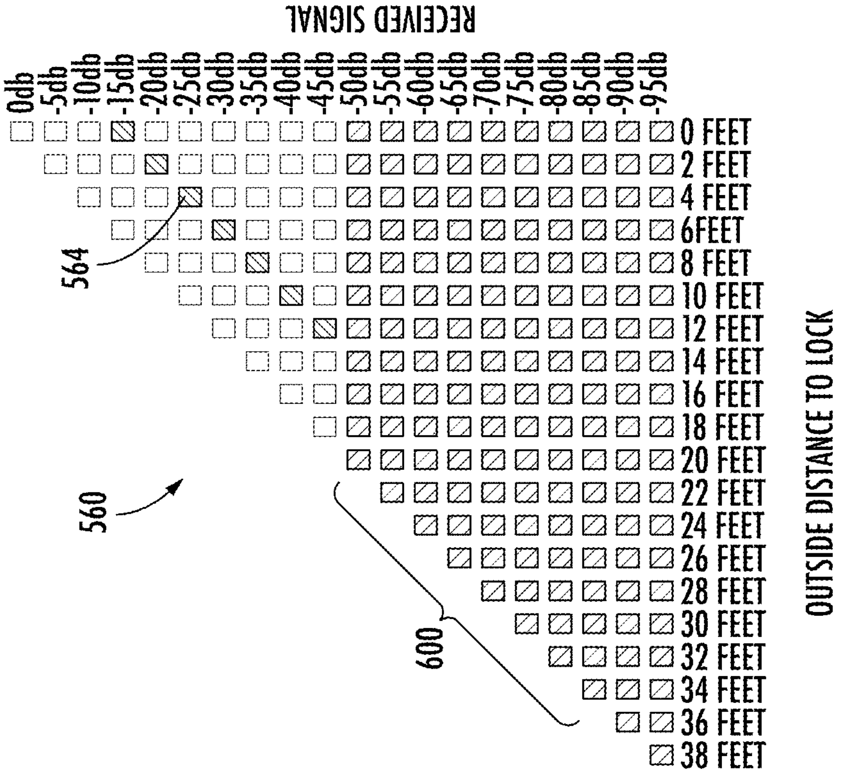

Furthermore, as shown in comparison between FIG. 9 and FIG. 10, the directional antenna 355A receives relatively stronger signals 554 from the exterior side 104B (see FIG. 9) and relatively weaker signals 556 from the interior side 104A (see FIG. 10) at equivalent distances from the door 104 as a result of the received signal pattern and/or sensitivity difference between the interior side 104A and the exterior side 104B shown in FIG. 7. Because of the difference in received signal strength, the specific level of the squelch signal 600 can be configured to suppress or otherwise cancel out signals received by the directional antenna 355A that have a received strength value that is less than or equal to a maximum received signal strength value from the interior side 104A. For example, as shown in graphs 560 and 562 in FIGS. 11 and 12, the squelch signal 600 is configured to suppress or cancel out signals with a strength value less than or equal to about −50 db, which as shown in FIG. 11, would enable the directional antenna 355A to still receive signals 564 from the exterior side 104B at values from about −45 db to about −15 db. As shown in FIG. 12, the squelch signal 600 cancels out or otherwise interferes with reception of signals with a signal strength equal to or less than about −50 db on both the interior side interior side 104A and the exterior side 104B of the door 104 as shown in graphs 560 and 562. Because the signals 556 (see FIG. 10) received on the interior side of the door 104 were equal to or less than −50 dB, the squelch signal 600 inhibits the directional antenna 355A from receiving actionable signals originating from beyond the interior side of the door 104. Additionally, as seen in FIGS. 11 and 12, the squelch signal 600 does not inhibit reception of signals in proximity (e.g. within a range of approximately 0-12 ft) of the exterior side 104B. Rather, the squelch signal 600 equally suppresses signals received by the directional antenna 355A that are below the maximum received signal strength value from the interior side 104A (e.g. −50 dB), which in turn limits the reception range of the directional antenna 355A on the exterior side 104B when compared with the reception range shown in FIG. 9 (e.g. 0-28 ft without the squelch signal 600 and 0-14 ft with the squelch signal 600).

Figure 14:
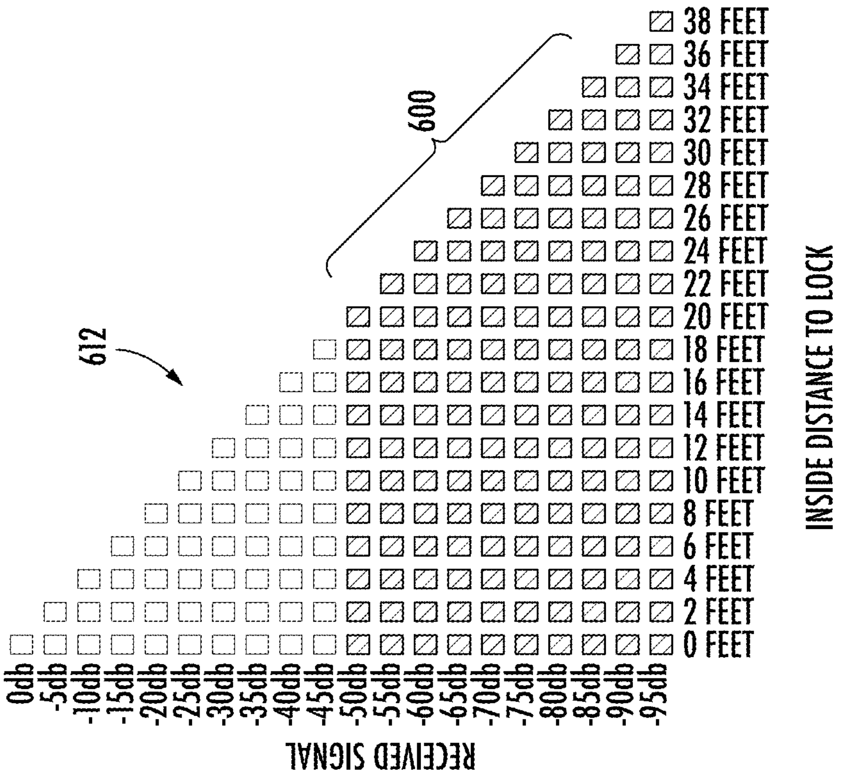
Figure 13:
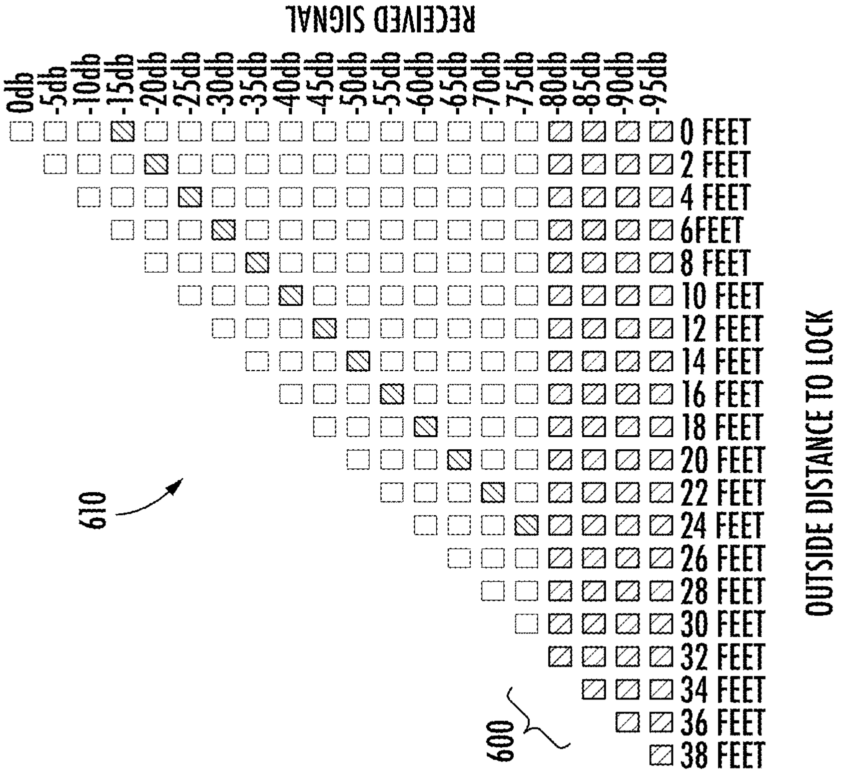

With reference to FIGS. 13 and 14, graphs 610, 612 illustrate when the squelch signal 600 is broadcast by the secondary antenna 355B and the secondary antenna 355B includes a directional antenna oriented towards the interior side 104A (e.g., opposite to the orientation of the directional antenna 355A), the squelch signal 600 can produce a greater suppression and/or cancelling effect on signals received by the directional antenna 355A from the interior side 104A as compared to signals received by the directional antenna 355A from the exterior side 104B. In particular, as shown in comparison between graphs 610 and 612, the squelch signal 600 is configured to suppress or cancel-out signals received by the directional antenna 355A from the interior side 144A with a strength value less than or equal to about −50 db (see FIG. 14) and to suppress or cancel-out signals received by the directional antenna 355A from the exterior side 144B with a strength value less than or equal to about −80 db (see FIG. 13). As such, the directional antenna 355A is configured to receive a greater range of signal strengths from the exterior side 104B (e.g., from about −75 db to about −15 db) as compared with an omni-directional squelch signal 600 described above with respect to FIGS. 11 and 12. Furthermore, use of the directional antenna embodiment for the secondary antenna 355B, produces a greater signal reception range (approximately 0-24 ft) on the exterior side 104B as compared to the omni-direction broadcast of the squelch signal 600 (e.g. approximately 0-12 ft).

Figure 15:
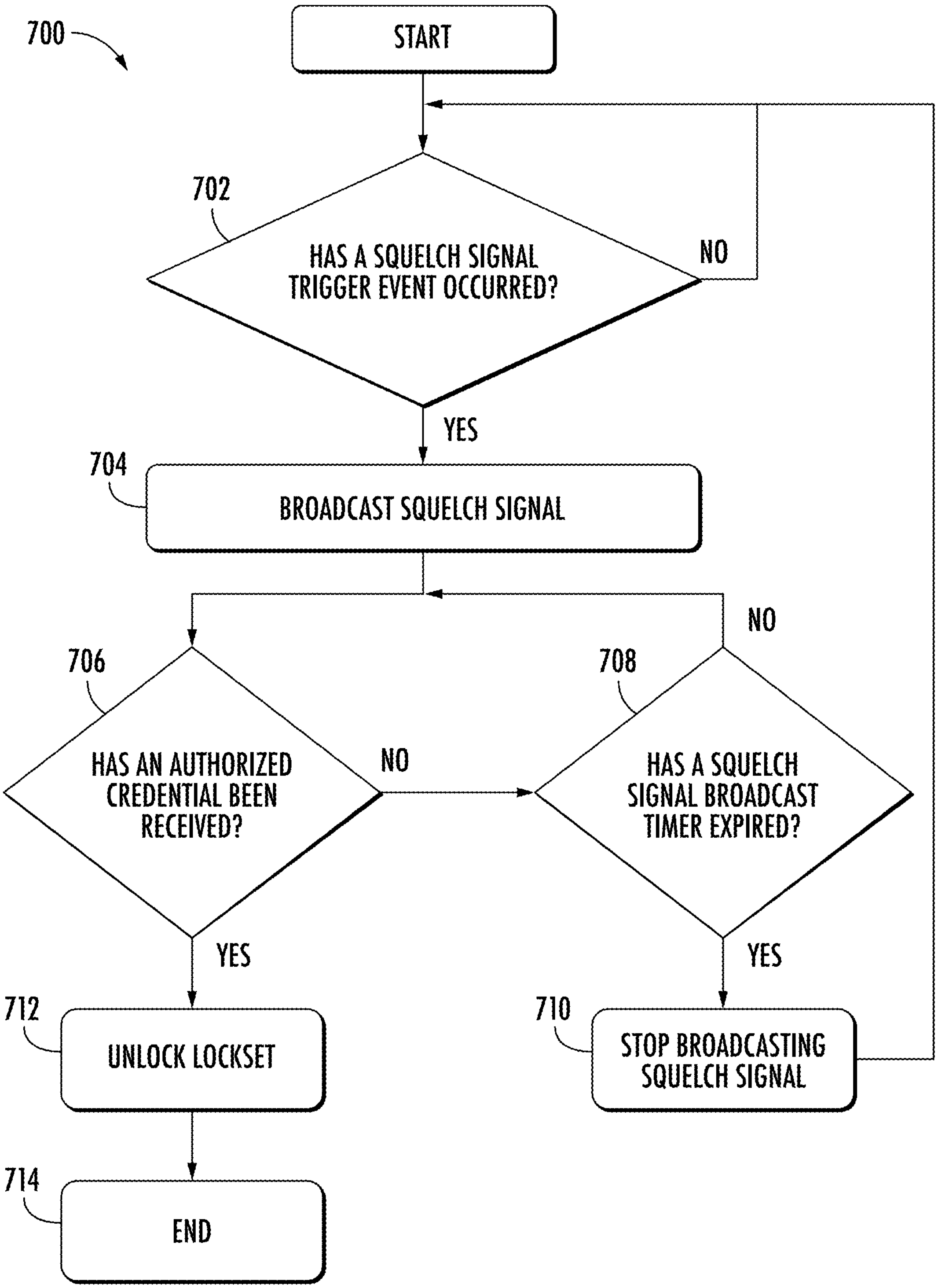
FIG. 15 is a flow chart of a method for operating the smart lockset of FIG. 1.

Referring now to FIG. 15 a flow chart of a method 700 for operating the smart lockset 102 is shown in accordance with an embodiment. The method 700 includes determining 702 whether a squelch signal trigger event has occurred. The squelch signal trigger event can include one or more squelch signal trigger events, such as the smart lockset 102 detecting the movement or presence of a person on the exterior side 104B of the door 104, the directional antenna 355A receiving an initial signal from a user device 202, a geofence boundary being crossed by a user device 202 or vehicle, an individual interrupting a light beam of a garage door operator photo eye system, and/or a signal from a vehicle loop detector. Further, various combinations of the squelch signal trigger events can be used, such as a first factor of the smart lockset 102 detecting the movement or presence of a person on the exterior side 104B of the door 104 and a second factor of the directional antenna 355A receiving an initial signal from a user device 202 in order to trigger the squelch signal at step 704.

When the squelch signal trigger event has not yet occurred, the operating method 700 can repeat the step of determining 702 regularly, periodically, etc. such as every second, for example. However, when the squelch signal trigger event has occurred, the operating method 700 initiates 704 a broadcast of the squelch signal 600.

After the initiating 704, the operating method 700 can include determining 706 whether an authorized credential has been received by the smart lockset 102. When no authorized credential has been received, the operating method 700 can include determining 708 whether a squelch signal broadcast timer has expired. When the squelch signal broadcast timer has not yet expired, the operating method 700 can include repeating the step of determining 706 receipt of an authorized credential and/or determining 708 expiration of the timer. However, when the squelch signal broadcast timer has expired, the operating method 700 can include stopping 710 the broadcast of the squelch signal 600 and returning to the step of determining 702 occurrence of a trigger event. Furthermore, when the step of determining 706 indicates that the authorized credential has been received during the broadcast of the squelch signal 600, the operating method 700 can include unlocking 712 of the smart lockset 102 and ending 714 of the operating method 700. At step 714, the smart lockset 102 may re-lock the smart lockset 712 once the door 104 has closed.

Figure 16:
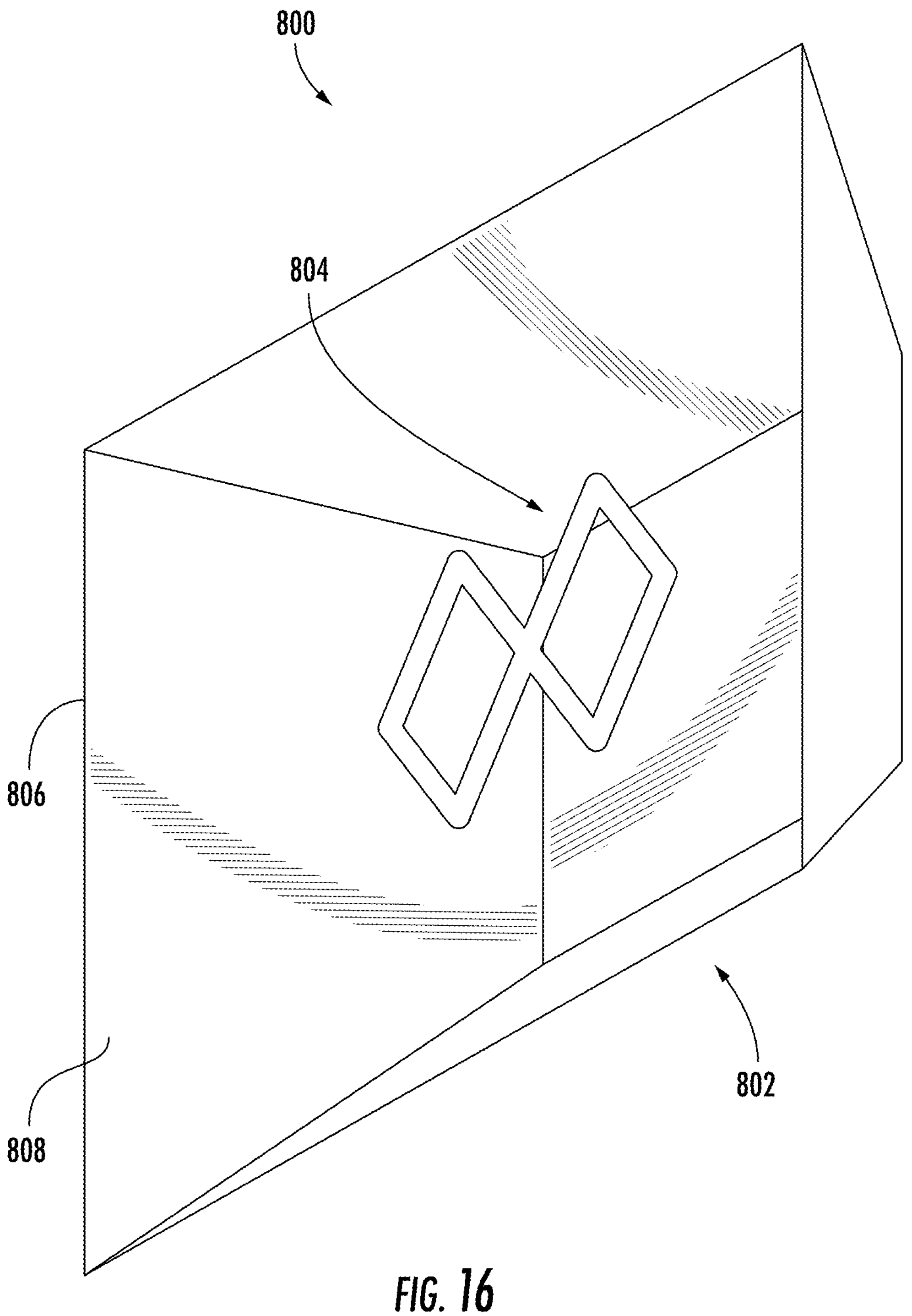
FIG. 16 is a perspective view of an example directional antenna.

With reference to FIG. 16, an example directional antenna 800 is provided. The directional antenna 800 has an antenna element, such as a biquad antenna 804, and a reflector 802. The reflector 802 has an opening 806 that faces in the direction of desired signal reception, e.g., in the lengthwise direction of primary lobe 501 of FIG. 7. The reflector 802 has one or more walls 808 made of a material to reduce a receiving range or sensitivity of the biquad antenna 804 in directions other than the direction of desired signal reception, e.g., in the lengthwise directions of ancillary lobes 502 in FIG. 7.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

Further aspects of the invention are provided by one or more of the following embodiments:

Embodiment 1. A lockset comprising: a housing configured to be mounted at a secured entrance; a radio module supported by the housing, the radio module generating: an antenna pattern for communicating with a user device; and a squelch signal that prevents the radio module from receiving a credential signal from the user device when the user device is at one or more locations within the antenna pattern; and a processor in communication with the radio module, wherein the processor unlocks a deadbolt to permit entry into a secured area delimited by the secured entrance in response to the radio module receiving the credential signal from the user device.

Embodiment 2. The lockset of any one or more of the embodiments, wherein the antenna pattern includes a primary lobe and one or more ancillary lobes, wherein the primary lobe projects in a directional manner away from the secured area, and wherein the one or more ancillary lobes project in a generally uniform manner outward from the radio module.

Embodiment 3. The lockset of any one or more of the embodiments, wherein the squelch signal encompasses the one or more ancillary lobes and prevents the radio module from receiving, via the ancillary lobes, the credential signal from the user device.

Embodiment 4. The lockset of any one or more of the embodiments, wherein the squelch signal comprises an interference signal that interferes with the one or more ancillary lobes to prevent the radio module from receiving the credential signal through the one or more ancillary lobes.

Embodiment 5. The lockset of any one or more of the embodiments, wherein the radio module comprises a primary antenna and a secondary antenna, wherein the antenna pattern is broadcast by the primary antenna, and wherein the squelch signal is broadcast by the secondary antenna.

Embodiment 6. The lockset of any one or more of the embodiments, wherein the primary antenna comprises a directional antenna, and wherein the secondary antenna comprises an omni-directional antenna.

Embodiment 7. The lockset of any one or more of the embodiments, wherein the secondary antenna comprises a directional antenna, and wherein the secondary antenna is configured to be oriented towards the secured area to direct the squelch signal towards the secured area.

Embodiment 8. The lockset of any one or more of the embodiments, wherein the radio module comprises a primary antenna and a secondary antenna, wherein the antenna pattern is broadcast by the primary antenna, and wherein the squelch signal is broadcast by the primary antenna.

Embodiment 9. The lockset of any one or more of the embodiments, wherein the radio module generates the squelch signal in response to a squelch signal trigger event and stops generating the squelch signal after a squelch signal timer expires.

Embodiment 10. The lockset of any one or more of the embodiments, wherein the processor further locks the deadbolt after a door at the secured entrance is subsequently closed.

Embodiment 11. A radio module for a lockset, the radio module comprising: a primary antenna that generates an antenna pattern including a primary lobe and one or more ancillary lobes, wherein the primary lobe projects in a directional manner, wherein the one or more ancillary lobes project in a generally uniform manner, and wherein the primary antenna is configured to receive a credential signal from a user device; and a secondary antenna that generates a squelch signal that interferes with the one or more ancillary lobes to prevent the primary antenna from receiving the credential signal through the one or more ancillary lobes.

Embodiment 12. The radio module of any one or more of the embodiments, wherein the radio module is in communication with a processor of the lockset, and wherein the radio module sends a received credential signal to the processor to unlock the lockset.

Embodiment 13. The radio module of any one or more of the embodiments, wherein the primary antenna comprises a directional antenna, wherein the secondary antenna comprises an omni-directional antenna, and wherein the squelch signal encompasses the one or more ancillary lobes.

Embodiment 14. The radio module of any one or more of the embodiments, wherein the secondary antenna initiates generation of the squelch signal in response to a squelch signal trigger event, the squelch signal trigger event including detecting movement or presence of a person on an exterior side of a door, receiving an initial signal from the user device, a geofence boundary being crossed by the user device or a vehicle, an interruption at a light beam of a garage door operator photo eye system, a signal from a vehicle loop detector, or any combination thereof.

Embodiment 15. The radio module of any one or more of the embodiments, wherein the primary antenna comprises a biquad antenna and a reflector, and wherein the reflector reduces a receiving range or sensitivity of the biquad antenna in directions other than a projecting direction of the primary lobe generated by the primary antenna.

Embodiment 16. The radio module of any one or more of the embodiments, wherein the secondary antenna is a directional antenna, and wherein the secondary antenna is configured to be oriented towards an interior side of a secured entrance.

Embodiment 17. A method of operating a lockset, the method comprising: generating, by a radio module of the lockset, an antenna pattern for communicating with a user device; determining, by a processor of the lockset, whether a squelch signal trigger event occurred; broadcasting, by the radio module, a squelch signal in response to the processor determining the squelch signal trigger event occurred, the squelch signal preventing the radio module from receiving a credential signal from the user device when the user device is at one or more locations within the antenna pattern; and stopping broadcast of the squelch signal upon expiration of a squelch signal broadcast timer, the squelch signal broadcast timer initiated by broadcast of the squelch signal.

Embodiment 18. The method of any one or more of the embodiments, wherein the squelch signal trigger event includes detecting movement or presence of a person on an exterior side of a door, receiving an initial signal from the user device, a geofence boundary being crossed by the user device or a vehicle, an interruption at a light beam of a garage door operator photo eye system, a signal from a vehicle loop detector, or any combination thereof.

Embodiment 19. The method of any one or more of the embodiments, further comprising: receiving, by the radio module, a credential signal from the user device after broadcast of the squelch signal is stopped; and unlocking a deadbolt of the lockset to permit entry into a secured area in response to the radio module receiving the credential signal from the user device.

Embodiment 20. The method of any one or more of the embodiments, wherein generating the antenna pattern is performed by a primary antenna, wherein broadcasting the squelch signal is performed by a secondary antenna, and wherein the primary and secondary antennas are different from one another.

What is claimed is:

1. A lockset comprising:

a housing configured to be mounted at a secured entrance;

a radio module supported by the housing, the radio module generating: an antenna pattern for communicating with a user device;

a squelch signal that prevents the radio module from receiving a credential signal from the user device when the user device is at one or more locations within the antenna pattern; and a processor in communication with the radio module, wherein the processor unlocks a deadbolt to permit entry into a secured area delimited by the secured entrance in response to the radio module receiving the credential signal from the user device;

wherein the antenna pattern includes a primary lobe and one or more ancillary lobes, wherein the primary lobe projects in a directional manner away from the secured area, and wherein the one or more ancillary lobes project in a generally uniform manner outward from the radio module; and wherein the squelch signal encompasses the one or more ancillary lobes and prevents the radio module from receiving, via the ancillary lobes, the credential signal from the user device.

2. The lockset of claim 1, wherein the squelch signal comprises an interference signal that interferes with the one or more ancillary lobes to prevent the radio module from receiving the credential signal through the one or more ancillary lobes.

3. The lockset of claim 1, wherein the radio module comprises a primary antenna and a secondary antenna, wherein the antenna pattern is broadcast by the primary antenna, and wherein the squelch signal is broadcast by the secondary antenna.

4. The lockset of claim 3, wherein the primary antenna comprises a directional antenna, and wherein the secondary antenna comprises an omni-directional antenna.

5. The lockset of claim 3, wherein the secondary antenna comprises a directional antenna, and wherein the secondary antenna is configured to be oriented towards the secured area to direct the squelch signal towards the secured area.

6. The lockset of claim 1, wherein the radio module comprises a primary antenna and a secondary antenna, wherein the antenna pattern is broadcast by the primary antenna, and wherein the squelch signal is broadcast by the primary antenna.

7. The lockset of claim 1, wherein the radio module generates the squelch signal in response to a squelch signal trigger event and stops generating the squelch signal after a squelch signal timer expires.

8. The lockset of claim 1, wherein the processor further locks the deadbolt after a door at the secured entrance is subsequently closed.

9. A radio module for a lockset, the radio module comprising:

a primary antenna that generates an antenna pattern including a primary lobe and one or more ancillary lobes, wherein the primary lobe projects in a directional manner, wherein the one or more ancillary lobes project in a generally uniform manner, and wherein the primary antenna is configured to receive a credential signal from a user device; and a secondary antenna that generates a squelch signal that interferes with the one or more ancillary lobes to prevent the primary antenna from receiving the credential signal through the one or more ancillary lobes.

10. The radio module of claim 9, wherein the radio module is in communication with a processor of the lockset, and wherein the radio module sends a received credential signal to the processor to unlock the lockset.

11. The radio module of claim 9, wherein the primary antenna comprises a directional antenna, wherein the secondary antenna comprises an omni-directional antenna, and wherein the squelch signal encompasses the one or more ancillary lobes.

12. The radio module of claim 9, wherein the secondary antenna initiates generation of the squelch signal in response to a squelch signal trigger event, the squelch signal trigger event including detecting movement or presence of a person on an exterior side of a door, receiving an initial signal from the user device, a geofence boundary being crossed by the user device or a vehicle, an interruption at a light beam of a garage door operator photo eye system, a signal from a vehicle loop detector, or any combination thereof.

13. The radio module of claim 9, wherein the primary antenna comprises a biquad antenna and a reflector, and wherein the reflector reduces a receiving range or sensitivity of the biquad antenna in directions other than a projecting direction of the primary lobe generated by the primary antenna.

14. The radio module of claim 9, wherein the secondary antenna is a directional antenna, and wherein the secondary antenna is configured to be oriented towards an interior side of a secured entrance.

15. A method of operating a lockset, the method comprising:

generating, by a radio module of the lockset, an antenna pattern for communicating with a user device;

determining, by a processor of the lockset, whether a squelch signal trigger event occurred;

broadcasting, by the radio module, a squelch signal in response to the processor determining the squelch signal trigger event occurred, the squelch signal preventing the radio module from receiving a credential signal from the user device when the user device is at one or more locations within the antenna pattern;

stopping broadcast of the squelch signal upon expiration of a squelch signal broadcast timer, the squelch signal broadcast timer initiated by broadcast of the squelch signal;

wherein the antenna pattern includes a primary lobe and one or more ancillary lobes, wherein the primary lobe projects in a directional manner away from the secured area, and wherein the one or more ancillary lobes project in a generally uniform manner outward from the radio module; and wherein the squelch signal comprises an interference signal that interferes with the one or more ancillary lobes to prevent the radio module from receiving the credential signal through the one or more ancillary lobes.

16. The method of claim 15, wherein the squelch signal trigger event includes detecting movement or presence of a person on an exterior side of a door, receiving an initial signal from the user device, a geofence boundary being crossed by the user device or a vehicle, an interruption at a light beam of a garage door operator photo eye system, a signal from a vehicle loop detector, or any combination thereof.

17. The method of claim 15, further comprising:

receiving, by the radio module, a credential signal from the user device after broadcast of the squelch signal is stopped; and unlocking a deadbolt of the lockset to permit entry into a secured area in response to the radio module receiving the credential signal from the user device.

18. The method of claim 15, wherein generating the antenna pattern is performed by a primary antenna, wherein broadcasting the squelch signal is performed by a secondary antenna, and wherein the primary and secondary antennas are different from one another.

* * * * *